2,881,143
WATER-EMULSION PAINTS CONTAINING CYANOETHYLATED STARCH

Albert R. Wilson, La Marque, Tex., assignor to Monsanto Chemical Company, St. Louis, Mo., a corporation of Delaware No Drawing. Application May 23, 1955
Serial No. 510,556

6 Claims. (Cl. 260—17.4)

This invention relates to water-emulsion paints. More particularly it relates to improved water-emulsion paint formulations which are stabilized against decomposition arising from attack by microorganisms.

Water-emulsion paints ordinarily consist of a colloidal dispersion of a pigment-containing natural or synthetic rubber latex in water. The more desirable of the paints ordinarily referred to as emulsion paints are those obtained by incorporating paint pigments into aqueous latices of synthetic polymers and these are the products with which the present invention is concerned. In recent years these water-emulsion paints have been developed to the extent that they have become a major replacement for the conventional solvent-type protective and decorative coatings. Their almost universal acceptance by the consumer and the considerable commercial importance they have acquired may be attributed to their many desirable properties such as ease of application, lack of brush marks, freedom from solvent odor, speed of drying, freedom from fire hazard, and economy in use. Despite their many attractive properties, however, they have some draw-backs. They frequently contain as stabilizers materials which are subject to attack by microorganisms and which as a result of such attack decompose or undergo putrefaction with development of an objectionable odor. Other undesirable properties such as mold or "bloom" in the paint film also result from this susceptibility to bacterial action.

It is, therefore, an object of the present invention to overcome these disadvantages by providing a polymer-containing water paint which is resistant to attack by microorganisms.

This and other objects of the invention which will become apaprent from the description to follow are attained in accordance with the invention by incorporating a cyanoethylated starch in the synthetic latex water-emulsion paint as the protective colloid, or, as it is sometimes termed, the stabilizer or dispersing agent. Paints containing cyanoethylated starch may be stored over long periods of time without "souring" or otherwise deteriorating as a result of attack by air-borne bacteria after exposure to air. All emulsion paint formulas call for a protective colloid or stabilizer to act as a thickening agent for the water phase and to reduce the mobility of dispersed particles. The presence of the protective colloid prevents paint instability due to coagulation of the emulsified polymer in the paint and gives the paint increased viscosity so that it will have "body" when applied by either brush or roller. The more commonly employed materials for this purpose include casein, dextrin, and starch but, as has been mentioned previously, these materials are decomposable and cause some deleterious effects in the paints. With cyanoethylated starch, all the advantageous dispersing or thickening effects of starch, casein, etc., are obtained with none of the disadvantages which result from their bacterial instability and no special preservatives, fungicides, or bactericides need be included in the formula to prevent decomposition or eliminate fungus or bacterial growth on the emulsion paint.

The essential ingredients of the water-base emulsion paints of the invention include pigment, polymer latex, water, cyanoethylated starch as a protective colloid, and an antifoaming agent. This specification of essential ingredients is not to be construed as excluding any of the other common additives ordinarily incorporated in minor amounts. Pigments, for example, are understood to include pigment extenders or fillers as well as the pigment itself, and other additives such as emulsifiers or surface-active agents, plasticizers, driers, anti-oxidants, pH regulators, etc., may all be included in the paint formula. The specific paint formulas may be many and varied, depending upon the particular properties desired in the final coating product.

In the usual method of emulsion paint preparation, the pigment "slip" or slurry is first prepared by dispersing the pigment in water and this dispersion is then carefully and thoroughly mixed with the latex. Other desired additives are then stirred in and the mixture is passed through a paint or colloid mill to obtain a substantially uniform paste of from 30 to 70% solids. Since most paint pigments are hydrophobic, a water dispersion of them suitable for mixing with the aqueous latex dispersion cannot be produced without the use of a stabilizer or protective colloid. Hence, the pigment "slip" according to the invention is prepared by adding the pigment or mixture of pigments to water and thereafter adding a disperson of cyanoethylated starch in water or the dry cyanoethylated starch as desired to effect dispersion of the pigment. The antiforming agent is then usually added to the pigment dispersion. Alternatively, part of the cyanoethylated starch may be added in the pigment slip and part may be added when the pigment dispersion and the latex dispersion are mixed together. While the preferred method consists of forming a water dispersion of the pigments first and then carefully mixing this dispersion with the latex, the pigments and cyanoethylated starch may be aded as dry powders to the latex if sufficient precautions, known to the art of compounding natural rubber latex, are taken to avoid coagulating the latex.

The following examples illustrate the invention but are not to be considered as limiting its scope in any manner. Unless otherwise indicated, all parts are by weight.

Example I

A mixture of 15 parts by weight of titanium dioxide (rutile), 10 parts by weight of lithopone, and 5 parts by weight of mica is added to about 20 parts by weight of water containing about 0.2 part of tetrasodium pyrophosphate with stirring and stirring is continued until the pigment mixture is thoroughly wetted. Then 10 parts by weight of cyanoethylated starch with a degree of substitution (d.s.) of 0.54 is added and the mixture is stirred until uniform in appearance. About 0.75 part of pine oil is added as an antifoamer and then about 40 parts of a latex containing 50% polymer produced by copolymerizing styrene and butadiene in the ratio of 70 parts to 30 parts by weight, respectively, in accordance with known procedures is carefully added to the pigment slurry or paste so as to prevent the formation of foam and the whole is stirred thoroughly for a period of from about 15 to about 30 minutes. The paint thus obtained does not decompose upon exposure to air nor is mold or fungus formation discernible on it after long periods of storage under warm humid conditions.

Example II

A pigment slurry is prepared by thoroughly mixing the following ingredients together:

| | Parts |
|---|---|
| Lithopone | 100 |
| Titanium dioxide (Rutile) | 150 |

|  | Parts |
|---|---|
| Ferrite yellow | 2 |
| Black iron oxide | 2 |
| Mica | 40 |
| Clay | 65 |
| Lorite (75% CaCO$_3$ and 25% diatomaceous silica) | 60 |
| Sodium salt of alkylaryl sulfonate | 3 |
| Tetrasodium pyrophosphate | 2 |
| Cyanoethylated starch (d.s.=0.67; 15% dispersion in water) | 175 |
| Water | 188 |

Thereafter 45 parts of four-minute heat bodied linseed oil, 1 part of 25% lead naphthenate, 3 parts of 6% cobalt naphthenate and 4 parts of pine oil are added to the pigment slurry. After incorporation of the oils and driers, the pigment slurry is passed through a colloid mill into a thin-down vessel. Thereafter, the milled emulsion is mixed with 300 parts of a polymer latex containing 200 parts of a 45% solids emulsion copolymer containing 60% styrene and 40% butadiene and 100 parts of an emulsion copolymer containing 80% styrene and 20% butadiene. The oil-modified paint thus produced does not deteriorate as a result of bacterial or fungicidal attack.

*Example III*

The following ingredients are carefully mixed and passed over a colloid mill to insure uniform dispersion of the pigmentary material:

|  | Parts |
|---|---|
| Titanium dioxide | 200 |
| Lithopone | 25 |
| Mica | 25 |
| Kaolin | 75 |
| Tetrasodium pyrophosphate | 2 |
| Cyanoethylated starch dispersion (d.s.=0.8; 14% solution in water) | 192 |
| Pine oil | 4 |
| Water | 112 |

To the milled pigment slurry is added 425 parts of a 45% solids polymer latex containing 60% styrene and 40% butadiene copolymerized by emulsion techniques. The paint resulting after thorough mixing is resistant to attack by bacteria by virtue of its cyanoethylated starch content.

*Example IV*

A latex paint having a pigment-volume concentration of about 35% is made by mixing together a pigment dispersion and a latex dispersion. The pigment dispersion is made by grinding the following composition in a pebble mill:

|  | Parts |
|---|---|
| Titanium dioxide | 70 |
| Lithopone | 20 |
| Mica | 10 |
| Potassium tripolyphosphate (3% aqueous solution) | 16.6 |
| Water | 37.8 |

The pigment slip is then mixed with a latex dispersion together with other materials as follows:

|  | Parts |
|---|---|
| Pigment slip | 154.4 |
| Cyanoethylated starch (d.s.=0.60; 15% aqueous solution) | 16.4 |
| Antifoamer | 0.5 |
| Latex—48% copolymer of about 50 mole percent styrene and 50 mole percent butadiene | 96.0 |

The white paint product so produced may be stored over long periods of time without "souring" or growing "moldy."

*Example V*

A paint pigment masterbatch is prepared by mixing in a can by means of a conventional paddle stirrer the following ingredients in the indicated proportions:

|  | Parts |
|---|---|
| Titanium dioxide | 21 |
| Lithopone | 6 |
| Silica and silicates | 3 |
| Color (if desired) | 3 |
| Water | 30 |
| Cyanoethylated starch (d.s.=0.7) | 3.0 |
| Antifoaming agent (pine oil) | 1.0 |
| Tetrasodium pyrophosphate | 0.2 |

The water containing the tetrasodium pyrophosphate as a pigment dispersant is stirred while the pigment mixture is added. The mixture is stirred for several minutes to thoroughly wet the pigment. The cyanoethylated starch is added and the mixture is stirred until uniform in appearance. An antifoaming agent is then added. A latex containing 45% polymer is prepared by polymerizing an aqueous emulsion containing 35 parts of butadiene, 60 parts of α-methylstyrene and 5 parts of acrylonitrile in the usual manner and containing as an additional stabilizer 2 parts of a mixture of equal proportions of ammonium oleate and glyceryl monoricinoleate. One part of the latex is mixed with 5 parts of the paint pigment masterbatch to provide a water paint containing 14% water which is resistant to bacterial attack.

*Example VI*

A latex is produced by blending equal parts of a polystyrene latex and a latex prepared by aqueous polymerization of 51 parts of p-chlorostyrene and 49 parts of isoprene. The mixed latex contains approximately 35% synthetic polymers. About 300 g. of this latex is mixed with 3 parts by weight of the pigment masterbatch described in Example V to produce a paint containing about 30% water. The paint thus produced may be stored under conditions ordinarily conducive to spoilage without undergoing decomposition even though no special preservative, fungicide, etc., has been included in the formula since the protective colloid present is cyanoethylated starch.

Many variations may be made both in the formulas and in the procedures given in the examples without departing from the scope of the invention. It is obvious that the particular paint ingredients have been listed merely for purposes of illustration and that other known pigments, wetting agents, antifoaming agents, polymer latices and the like may be used and the concentrations thereof may be varied within fairly wide and readily determinable limits. Suitable pigments, pigment extenders and fillers in addition to those mentioned, for example, include titanium oxide (anatase), zinc sulfide, barium sulfate, white lead, talc, organic dyes and colored pigments such as carbon black, iron oxide, cadmium yellows, phthalocyanines, ultramarine, chromium oxides, umber and sienna, china clay, kaolin, and the like.

In addition to pine oil, kerosene, compounds such as those known under the trademarks "Antifoam A" (Dow Corning Co.), "Defoamer ED" (El Dorado Oil Works) and "Foamex" (Glyco Products Co.) are also useful as antifoaming or defoaming agents.

Suitable polymer latices may be produced by the aqueous emulsion polymerization of one or more conjugated dienes with one or more ethylenic compounds polymerizable therewith. Suitable dienes are butadiene-1,3, isoprene, 2,3-dimethylbutadiene-1,3, piperylene, 2-chlorobutadiene-1,3, 2,3-dichlorobutadiene-1,3, 2-bromobutadiene-1,3, 2-fluorobutadiene-1,3, 2,3-difluorobutadiene-1,3 and the like. Suitable compounds polymerizable with the dienes are the compounds containing a single aliphatic olefin group, and especially the ethylenic compounds, each of which contains a

group. Examples include the vinyl aromatic compounds such as styrene, vinyltoluene, divinylbenzene, the nuclearly substituted styrenes such as the chlorostyrenes and alkyl styrenes, alpha-chlorostyrene, alpha-methylstyrene, vinylnaphthalene, vinylpyridine, vinylcarbazole and the like; the alpha methylene carboxylic acids and esters, nitriles, aldehydes and amides thereof such as acrylic acid, acrylamide, methyl acrylate, methyl methacrylate, methacrylic acid, methacrylamide, acrolein, acrylonitrile, methacrylonitrile and the like; vinyl aliphatic compounds such as vinyl chloride, vinyl bromide, vinyl fluoride, vinyl acetate, vinyl propionate, vinyl formate, vinyl methyl ther, vinyl ethyl ether, divinyl ether, vinyl ethyl sulfone, the vinyl thioethers, and the like; vinylidene fluoride, 1-chloro-1-fluoro-ethene, vinylidene cyanide, and the like; and alpha-olefins, such as isobutene, ethylene and propylene. The synthetic polymers may be copolymers, which include terpolymers and other interpolymers. A copolymer latex may be intermixed with one or more additional synthetic polymer latices; for example, a high styrene-low butadiene copolymer latex may be blended with a poly-styrene latex. Alternatively, a rubbery polymer latex (for example, a 60-butadiene, 40-styrene copolymer latex) may be mixed with styrene, and the latter polymerized in the latex to produce a non-rubbery polymer latex for paint; or a resinous polymer latex (for example, polystyrene latex or a 70-styrene, 30-butadiene copolymer latex) may be mixed with butadiene (or mixture of any of the above monomers, rich in diene) and the latter polymerized in the latex to produce a suitable non-rubbery paint latex.

The polymerizations are effected in accordance with known procedures in the presence of the usual polymerization catalysts, and in the presence of emulsifying agents, buffers, catalyst activators, retarders, modifiers, short-stopping agents and the like if desired. Usually, the polymerizable compounds, in relative proportions corresponding to the desired composition of the copolymeric product, are admixed with an aqueous solution of an emulsifying agent and the mixture is agitated to effect emulsification. A variety of suitable emulsifying agents such as sodium oleate, sodium sulfate esters of high alcohols and sodium sulfonates of alkylated naphthalenes, biphenyls, etc., are known to the art. The emulsifying agent is usually employed in an amount corresponding to from 0.5 to 5% of the weight of the polymerizable organic compounds, but it may be used in smaller or larger proportions. A peroxide, such as hydrogen peroxide, potassium persulfate, or benzoyl peroxide is usually added in an amount corresponding to from 0.5 to 4% of the weight of the compounds to be polymerized, but it is not required. The emulsion is heated in a closed container usually at temperatures between 50° and 100° C. to effect polymerization. The progress and extent of the polymerization reaction may be followed by observing the decrease in pressure as the reaction progresses. The polymerization procedures are comparable to and may be identical with the many well known processes of manufacturing the various commercial synthetic rubbers.

Another type of synthetic polymer which may be incorporated in a water paint is known by the generic name of "silicones," either oily, resinous or rubbery. A relatively small amount of a silicone water dispersion or latex may be mixed into a water paint, alone or in addition to another polymer latex, to improve the washability and weather resistance of the paint film. The silicones may be prepared as is well known in the art, for example, by reacting a silane, substituted by one or two hydrocarbon radicals and two halogens or alkoxy radicals, with water. The polymeric silicone may be dispersed in water by any of the well known dispersion techniques.

The essence of the invention, of course, resides in the employment of cyanoethylated starch as the protective colloid in the water-base emulsion paint formula. The cyanoethylated starch most useful for this purpose is a cyanoethyl ether of starch having a degree of substitution of less than 1 and preferably from about 0.5 to about 0.8, i.e., a product in which there has been introduced less than one cyanoethyl group or preferably from about 0.5 to about 0.8 cyanoethyl group per glucose unit of the starch. Cyanoethylated starches having degrees of substitution greater than one may be employed but are not as satisfactory in this application because of the changes in solubility characteristics which accompany increases in degree of substitution.

Cyanoethylated starch is readily prepared by reacting starch with acrylonitrile in the presence of an alkaline catalyst such as aqueous sodium hydroxide according to techniques well known in the art. The degree of substitution is controlled by regulating the time of gelatinization, the reaction time, and the mole ratio of reactants. All types of starch are suitable—corn starch, potato starch, tapioca starch, etc. In a typical preparation, 500 g. of corn starch is gelatinized by kneading with 790 g. of 5% aqueous sodium hydroxide (40 g. of sodium hydroxide in 750 ml. of water) for from 10 to 30 minutes in a suitable mixer. To the smooth paste is added 400 ml. (320 g.) of acrylonitrile and the mixture is reacted for a period of about 15 minutes with the temperature maintained in the range from about 35–40° C. At the end of the reaction period, about 60 ml. of glacial acetic acid is kneaded into the reaction mixture to neutralize the caustic. The liquor is drained off and the product is thoroughly washed with methanol, dried at 60° C. under vacuum for about 16 hours, and then broken up and ground. The cyanoethylated starch produced forms a smooth colloidal sol in hot water, is non-toxic, and resistant to attack by microorganisms. It may be added in the paint formula as a dry powder or as a dispersion in water, either hot or cold.

What is claimed is:

1. A water-base emulsion paint resistant to decomposition arising from attack by microorganisms comprising an intimate mixture of a pigment, an aqueous dispersion of a copolymer composed of from about 20% to about 40% by weight of a conjugated diene and correspondingly from about 80% to about 60% by weight of an ethylenic compound polymerizable therewith in chemically combined form, and cyanoethylated starch as a protective colloid.

2. The composition of claim 1 in which the cyanoethylated starch has a degree of substitution in the range from about 0.1 to about 1.

3. The composition of claim 1 wherein the cyanoethylated starch has a degree of substitution in the range from about 0.5 to about 0.8.

4. A water-base emulsion paint resistant to decomposition arising from attack by microorganisms comprising an intimate mixture of a pigment, an aqueous dispersion of a copolymer composed of from about 20% to about 40% by weight of butadiene and correspondingly from about 80% to about 60% by weight of styrene in chemically combined form, and cyanoethylated starch as a protective colloid.

5. The composition of claim 4 in which the cyanoethylated starch has a degree of substitution from about 0.1 to about 1.

6. The composition of claim 4 wherein the cyanoethylated starch has a degree of substitution in the range from about 0.5 to about 0.8.

References Cited in the file of this patent

UNITED STATES PATENTS

| | | |
|---|---|---|
| 2,316,128 | Bock et al. | Apr. 6, 1943 |
| 2,316,129 | Bock et al. | Apr. 6 1943 |

OTHER REFERENCES

Official Digest, September 1952, pages 620-625.
C.A., vol. 47, page 9005.

UNITED STATES PATENT OFFICE
Certificate of Correction

Patent No. 2,881,143            April 7, 1959

Albert R. Wilson

It is hereby certified that error appears in the printed specification of the above numbered patent requiring correction and that the said Letters Patent should read as corrected below.

Column 2, line 29, for "antiforming" read —antifoaming—; column 3, line 33, *Example III*, opposite "Lithopone", for "25" read —100—; column 5, line 12, for "ther" read —ether—.

Signed and sealed this 18th day of August 1959.

[SEAL]

Attest:
KARL H. AXLINE,
*Attesting Officer.*

ROBERT C. WATSON,
*Commissioner of Patents.*